United States Patent

Shih

[11] Patent Number: 5,987,755
[45] Date of Patent: Nov. 23, 1999

[54] SHEAR DEVICE HAVING DOUBLE SECURITY MECHANISM

[76] Inventor: Cheng Hsiung Shih, No. 22, Lane 63, Wen Chang 1st Road, Da Du Hsiang, Taichung Hsien, Taiwan

[21] Appl. No.: 09/097,453

[22] Filed: Jun. 15, 1998

[51] Int. Cl.⁶ .................................................. B26B 13/28
[52] U.S. Cl. ............................................. 30/262; 30/254
[58] Field of Search ........................... 30/254, 258, 262

[56] References Cited

U.S. PATENT DOCUMENTS

| | | | |
|---|---|---|---|
| 154,637 | 9/1874 | Breeden | 30/262 |
| 3,416,226 | 12/1968 | Pfaffenbach | 30/262 |
| 4,341,016 | 7/1982 | Harrison et al. | 30/262 |
| 4,980,975 | 1/1991 | Hodson | 30/262 |
| 5,297,343 | 3/1994 | Melter et al. | 30/262 |
| 5,367,774 | 11/1994 | Labarre et al. | 30/262 |
| 5,625,952 | 5/1997 | Thomas | 30/262 |

*Primary Examiner*—Hwei-Slu Payer

[57] ABSTRACT

A shear device includes a pair of handles having one end pivotally coupled together at a pivot shaft, and a pair of cutter blades secured to the handles and each having a notch. A knob is slidably engaged in the handles and includes a pin for engaging with the notches and for securing the cutter blades together. A button is slidably engaged in one of the handles. The knob includes a pawl for hooking to the button and for securing the knob to the button such that the knob may be secured to the handles and such that the pin may not be disengaged from the notches of the cutter blades.

9 Claims, 6 Drawing Sheets

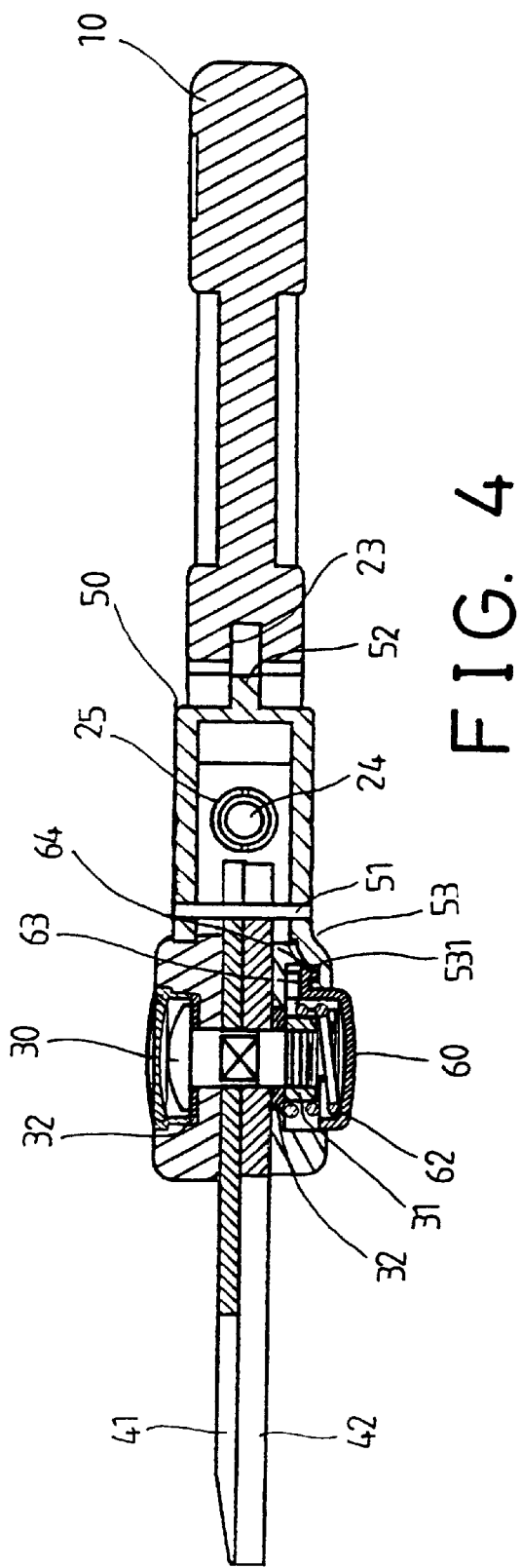
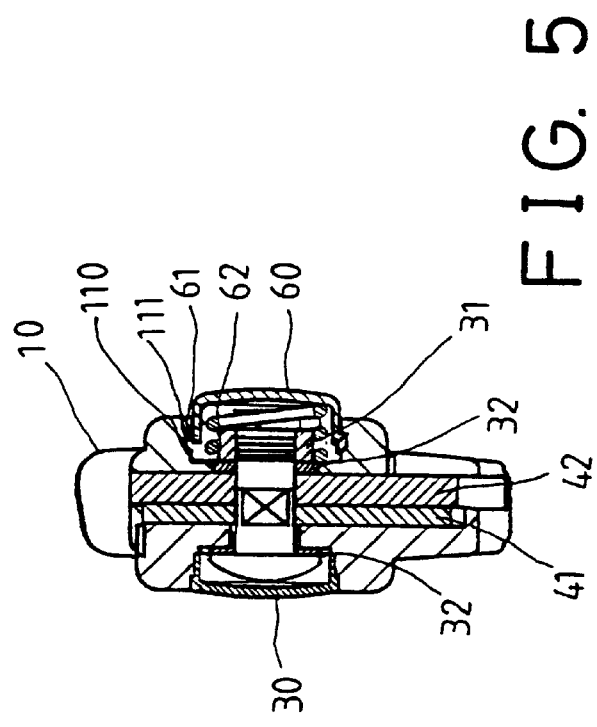

SHEAR DEVICE HAVING DOUBLE SECURITY MECHANISM

BACKGROUND OF THE INVENTION

1. Field of the Invention

The present invention relates to a shear device, and more particularly to a shear device having a double security mechanism.

2. Description of the Prior Art

Typical shear devices comprise a pair of handles and cutters or jaws pivotally coupled together at the middle portion, and a security lock device for securing the handles and the jaws together and for preventing the jaws from being separating from each other. However, the typical security lock may be easily opened by the children inadvertently.

The present invention has arisen to mitigate and/or obviate the afore-described disadvantages of the conventional shear devices.

SUMMARY OF THE INVENTION

The primary objective of the present invention is to provide a shear device having a double security mechanism for preventing the jaws or cutters from being separating from each other inadvertently.

In accordance with one aspect of the invention, there is provided a shear device comprising a pair of handles including a first end pivotally coupled together at a pivot shaft, a pair of cutter blades secured to the first ends of the handles respectively, a first locking means for securing the cutter blades together, and a second locking means for locking the first locking means in-place. The shear device thus includes a double security mechanism for preventing the jaws or cutters from being separating from each other inadvertently by the children and for preventing the shear device to be operated by the children inadvertently.

The cutter blades each includes a notch, the first locking means includes a pin slidably engaged in the handles, and means for moving the pin to engage with the notches of the cutter blades and to lock the cutter blades in place. The handles includes a channel, the first locking means includes a knob slidably engaged in the channel, the pin is secured in the knob for allowing the pin to be moved to engage with the notches of the cutter blades by the knob. The handles includes a slot, the knob includes a guide extended therefrom for slidably engaging with the slot of the handles and for guiding the knob to move relative to the handles. The second locking means is provided for locking the knob to the handles. The second locking means includes a button slidably engaged in the first end of a first of the handles, and means for locking the knob to the button. The button includes a hook extended therefrom, the knob includes a hook for engaging with the hook of the button and for securing the knob to the button.

A limiting means is further provided for preventing the button from being disengaged from the first handle. The first handle includes a recess for slidably receiving the button and includes a cavity communicating with the recess, and the button includes a ratchet stop for engaging with the cavity and for preventing the button from being disengaged from the first handle and for allowing the button to be depressed inward of the recess. A spring means is further provided for biasing the hook of the button to engage with the hook of the knob.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 4 and 5 are cross sectional views taken along lines 4—4 and 5—5 of FIG. 3 respectively;

DETAILED DESCRIPTION OF THE PREFERRED EMBODIMENT

Figure 1:
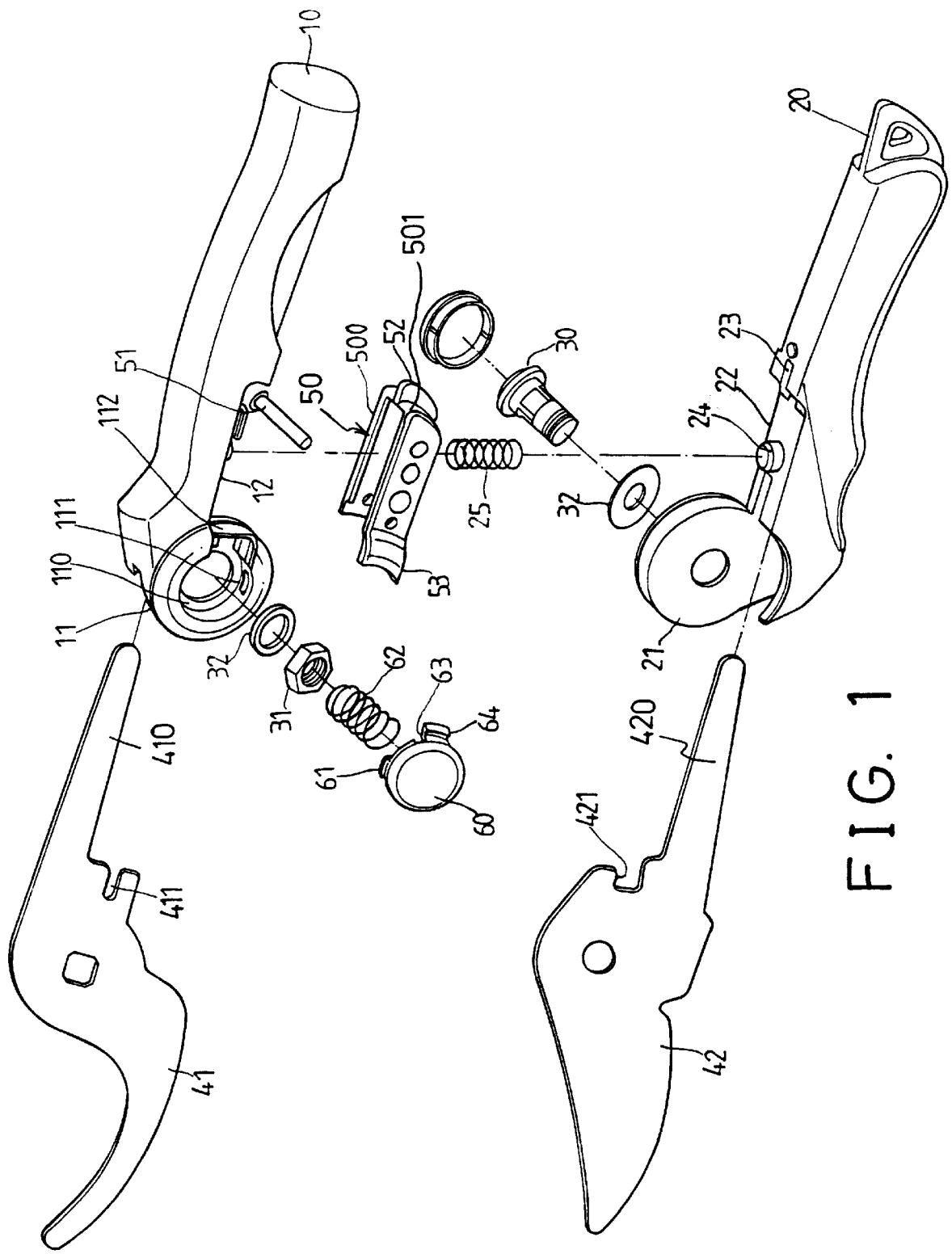
FIG. 1 is an exploded view of a shear device in accordance with the present invention.

Referring to the drawings, and initially to FIGS. 1–5, a shear device in accordance with the present invention comprises a pair of handles 10, 20 pivotally coupled together at one end 11, 21 with a pivot shaft 30 which is engaged with a nut 31. Two or more washers 32 are engaged on the shaft 30 and engaged with the ends 11, 21 of the handles 10, 20. A pair of jaws or cutter blades 41, 42 each has one end 410, 420 secured in the one end 11, 21 of the handles 10, 20 by such as force-fitted engagement or by welding processes or by adhesive materials, and each has a notch 411, 421 formed in the middle portion and located close to the one end 11, 21 of the handles 10, 20. The cutter blades 41, 42 and the handles 10, 20 may also be solidly secured together or formed integral by molding processes. The handles 10, 20 each includes a bulge 24 for engaging with a spring 25 that is biased between the handles 10, 20 for biasing the handles 10, 20 to rotate about the pivot shaft 30 and for biasing the handles 10, 20 and the cutter blades 41, 42 away from each other.

Figure 6:
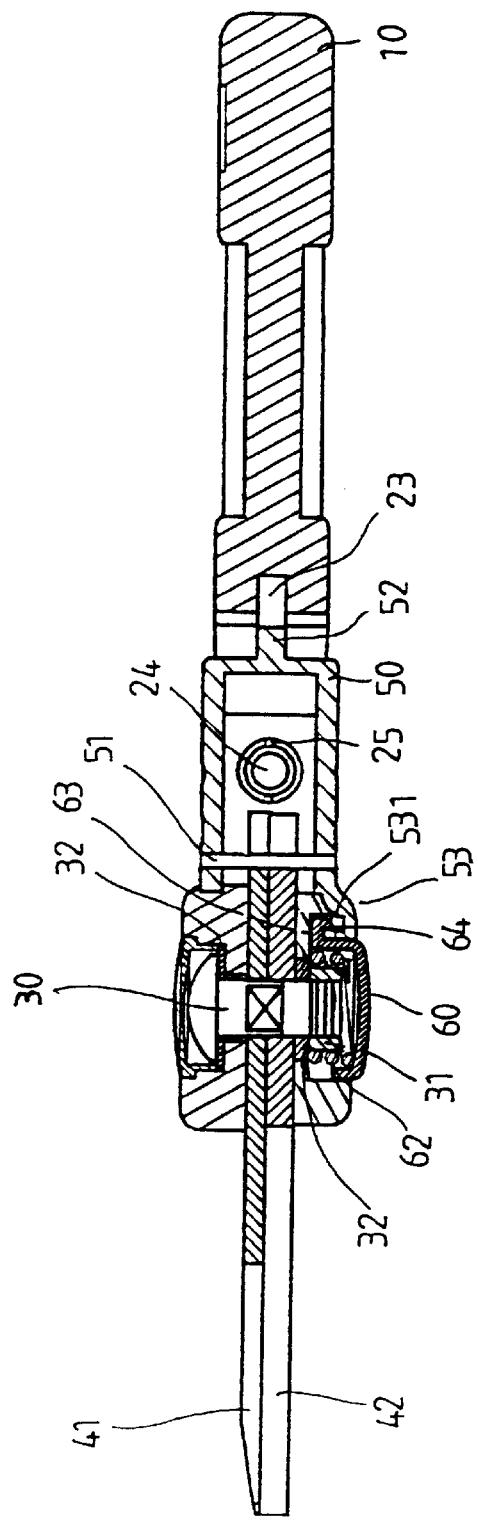
FIGS. 6 and 7 are cross sectional views similar to FIG. 4, illustrating the operation of the shear device.
Figure 7:
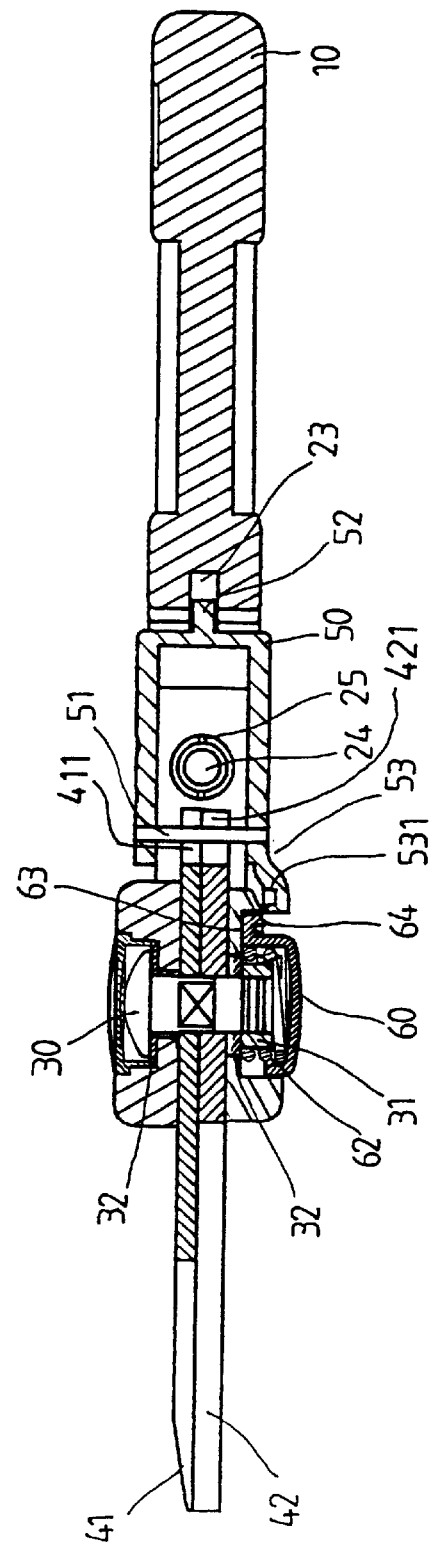

The handles 10, 20 each includes a pair of opposite channels 12, 22 for slidably receiving a knob 50. The knob 50 includes two bars 500 having a rear end 501 secured together and having a guide 52 extended rearward from the rear end 501 thereof, and includes a pin 51 secured to the front portion and includes a pawl 53 extended forward from one of the bars 500 and includes a hook 531 extended from the free end of the pawl 53 (FIGS. 4, 6, 7). One or both of the handles 10, 20 include a slot 23 for slidably receiving the guide 52 and for guiding the knob 50 to move longitudinally relative to the handles 10, 20 and for guiding the pin 51 to move to engage with or to be disengaged from the notches 411, 421 of the cutter blades 41, 42 (FIGS. 4, 6, 7). The pin 51 is confined between the ends 11, 21 of the handles 10, 20 and the spring 25 such that the knob 50 may be prevented from being disengaged from the handles 10, 20. It is preferable that the knob 50 includes a pair of guides for slidably engaging with the channels 12 or 22 and for allowing the knob 50 to be slidably engaged with one of the handles 10, 20.

Accordingly, as shown in FIGS. 4, 6, 7, when the pin 51 is moved forward to engage with the notches 411, 421 of the cutter blades 41, 42 by the knob 50, the cutter blades 41, 42 are locked together and may not be disengaged from each other at this moment. The engagement of the pin 51 with the notches 411, 421 of the cutter blades 41, 42 thus forms a first security device for the shear device.

The one end 11 of the handle 10 includes an annular recess 110 and includes a lateral cavity 111 and a groove 112 formed therein and communicating with the annular recess 110. A button 60 is slidably engaged in the annular recess 110 and includes a ratchet stop 61 laterally extended outward for slidably engaging with the cavity 111 and for preventing the button 60 from being disengaged from the handle 10. The ratchet stop 61 allows the button 60 to be moved inward of the annular recess 110 (FIG. 5). A spring 62 is engaged between the one end 11 of the handle 10 and the button 60 for biasing the button 60 outward of the annular recess 110 and for allowing the button 60 to be moved inward of the annular recess 110 against the spring 62. The button 60 includes an extension 63 slidably engaged in the groove 112 and includes a hook 64 extended from the free end of the extension 63 for engaging with the hook 531 of the pawl 53 of the knob 50.

Figure 2:
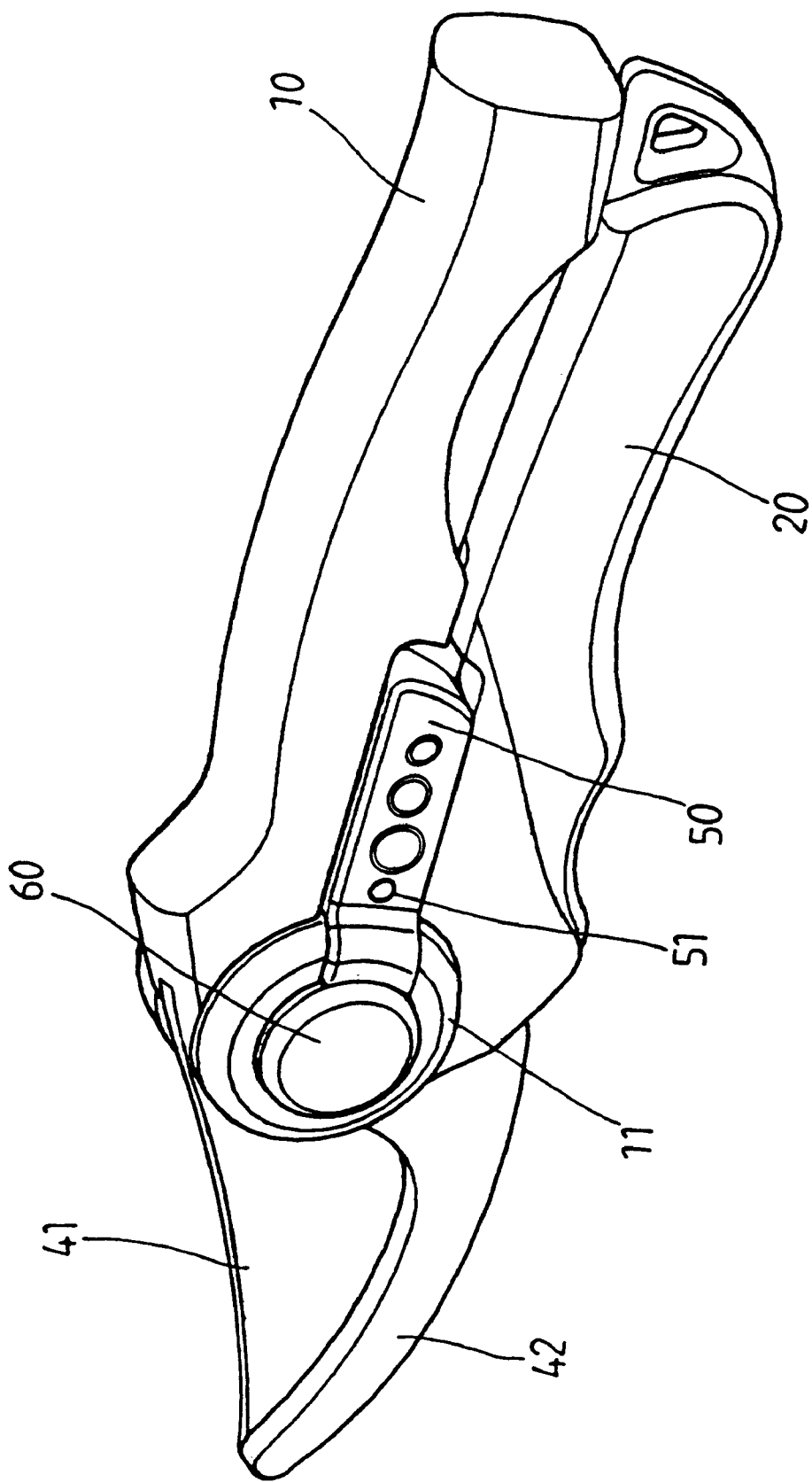
FIG. 2 is a perspective view of the shear device.
Figure 3:
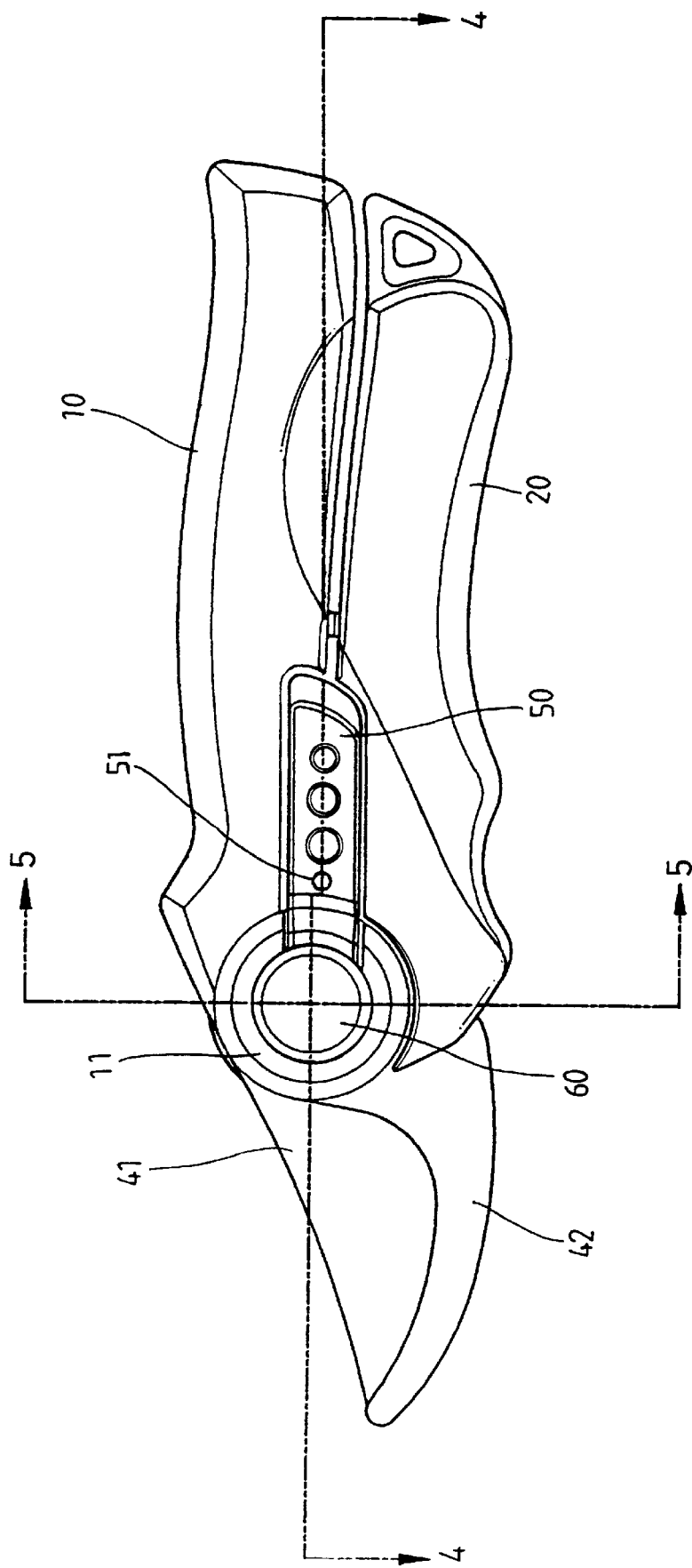
FIG. 3 is a plan view of the shear device.

In operation, as shown in FIG. 7, when the pin 51 is moved forward, by the knob 50, to engage with the notches 411, 421 of the cutter blades 41, 42 and before the hook 531 of the pawl 53 is engaged with the hook 64 of the button 60, the cutter blades 41, 42 may be locked together by the pin 51. As shown in FIGS. 2–4, when the knob 50 is further moved toward the cutter blades 41, 42 for engaging the hook 531 of the pawl 53 with the hook 64 of the button 60, the pin 51 may be locked in place such that the cutter blades 41, 42 may further be locked together. In order to release the knob 50, it is only required to depress the button 60 inward of the recess 110 against the spring 62 for disengaging the hook 531 of the pawl 53 and the hook 64 of the button 60.

Figure 8:
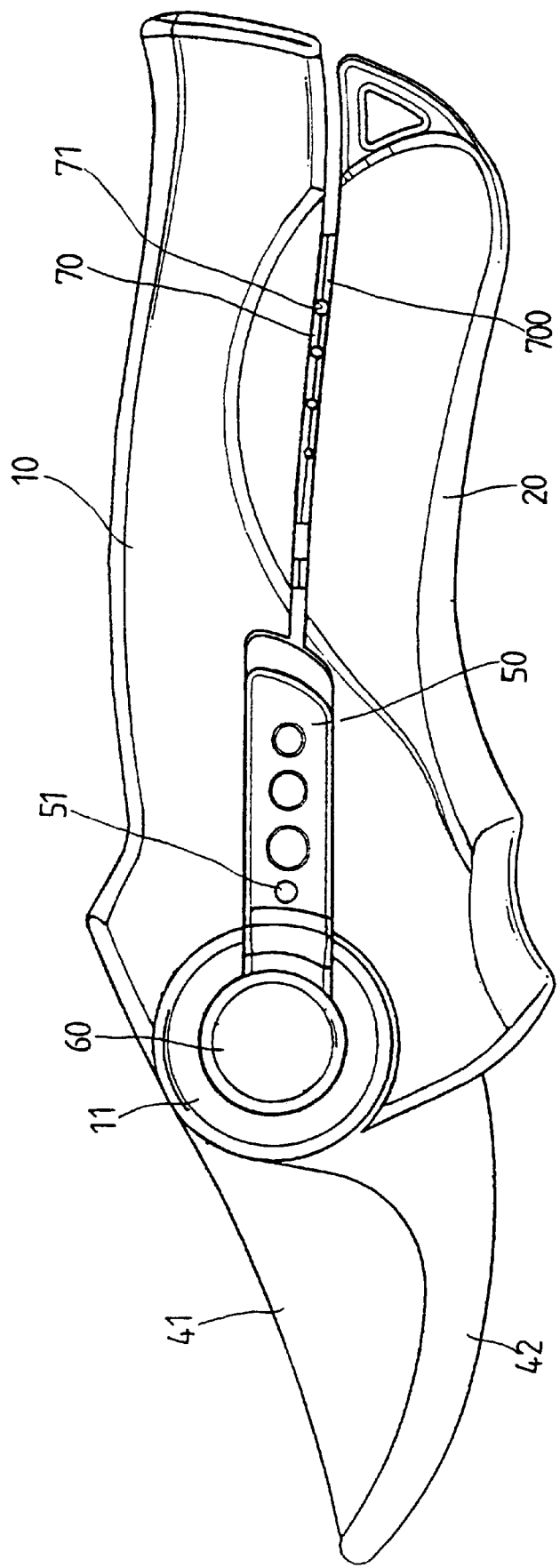
FIG. 8 is a plan view showing the other application of the shear device.

Referring next to FIG. 8, the handles 10, 20 may each include a stripper blade 70, 700 having one or more cutter edges 71 for stripping purposes.

Accordingly, the shear device in accordance with the present invention includes a double security mechanism for preventing the jaws or cutters from being separating from each other inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A shear device comprising:
   a pair of handles each including a first end pivotally coupled together at a pivot shaft,
   a pair of cutter blades secured to said first ends of said handles respectively,
   a first locking means for securing said cutter blades together, and
   a second locking means for locking said first locking means in place,
   said cutter blades each including a notch, said first locking means including a pin slidably engaged in said handles, and means for moving said pin to engage with said notches of said cutter blades and to lock said cutter blades in place.

2. The shear device according to claim 1, wherein said handles each includes a channel, said means for moving includes a knob slidably engaged in said channel, said pin is secured in said knob for allowing said pin to be moved to engage with said notches of said cutter blades by said knob.

3. The shear device according to claim 2, wherein at least one of said handles includes a slot, said knob includes a guide extended therefrom for slidably engaging with said slot of said handles and for guiding said knob to move relative to said handles.

4. The shear device according to claim 2, wherein said second locking means is provided for locking said knob to said handles.

5. The shear device according to claim 4, wherein said second locking means includes a button slidably engaged in said first end of a first of said handles, and means for locking said knob to said button.

6. The shear device according to claim 5, wherein said button includes a hook extended therefrom, said knob includes a hook for engaging with said hook of said button and for securing said knob to said button.

7. The shear device according to claim 5 further comprising means for preventing said button from being disengaged from said first handle.

8. The shear device according to claim 7, wherein said first handle includes a recess for slidably receiving said button and includes a cavity communicating with said recess, and said button includes a ratchet stop for engaging with said cavity and for preventing said button from being disengaged from said first handle and for allowing said button to be depressed inward of said recess.

9. The shear device according to claim 8 further comprising means for biasing said hook of said button to engage with said hook of said knob.

* * * * *